(12) United States Patent
Hosokawa et al.

(10) Patent No.: US 12,722,347 B2
(45) Date of Patent: Sep. 1, 2026

(54) MANUFACTURING DEVICE AND MOLDING METHOD FOR ROTARY-COMPONENT REINFORCEMENT CARBON FIBER REINFORCED PLASTIC

(71) Applicant: TORAY INDUSTRIES, INC., Tokyo (JP)

(72) Inventors: Naofumi Hosokawa, Iyo-gun (JP); Koji Yamaguchi, Tokyo (JP)

(73) Assignee: TORAY INDUSTRIES, INC., Tokyo (JP)

( * ) Notice: Subject to any disclaimer, the term of this patent is extended or adjusted under 35 U.S.C. 154(b) by 169 days.

(21) Appl. No.: 18/701,021

(22) PCT Filed: Sep. 14, 2022

(86) PCT No.: PCT/JP2022/034363
§ 371 (c)(1),
(2) Date: Apr. 12, 2024

(87) PCT Pub. No.: WO2023/095424
PCT Pub. Date: Jun. 1, 2023

(65) Prior Publication Data

US 2025/0001707 A1 Jan. 2, 2025

(30) Foreign Application Priority Data

Nov. 29, 2021 (JP) ................................ 2021-193088

(51) Int. Cl.
*B29C 70/34* (2006.01)
*B29C 70/20* (2006.01)
(Continued)

(52) U.S. Cl.
CPC ............ *B29C 70/34* (2013.01); *B29C 70/205* (2013.01); *B29C 70/54* (2013.01);
(Continued)

(58) Field of Classification Search
CPC ............ B29D 99/0082; B29D 99/0085; B29K 2105/0881; B29K 2063/00;
(Continued)

(56) References Cited

U.S. PATENT DOCUMENTS 4,889,668 A * 12/1989 Kemp .................... B29C 43/52 264/40.5
5,152,949 A * 10/1992 Leoni ................. B29C 43/3642 425/389
(Continued)

FOREIGN PATENT DOCUMENTS

CN 214626553 U 11/2021
DE 102016224367 A1 * 6/2018 .......... B29C 43/102
(Continued)

OTHER PUBLICATIONS

International Search Report, issued in PCT/JP2022/034363, PCT/ISA/210, dated Nov. 8, 2022.
(Continued)

*Primary Examiner* — Susan D Leong
*Assistant Examiner* — Vipul Malik
(74) *Attorney, Agent, or Firm* — Birch, Stewart, Kolasch & Birch, LLP

(57) ABSTRACT

A manufacturing device and a molding method for reinforcing a rotary component with carbon fiber reinforced plastic (CFRP), the manufacturing device molding a ring to reinforce a rotary component having a circular cross section as an outer layer, in a mold where a unidirectional prepreg comprising a thermosetting resin and carbon fibers is wound on the rotary component is heated and cured, an annular pressure source that applies external pressure to the prepreg via thermal expansion is disposed between a cavity of the mold and the prepreg. The manufacturing device and molding method are suitable for mass production, provide high
(Continued)

productivity with low-cost equipment, reduce manufacturing cost by eliminating disposable secondary materials and enabling reuse of members, and uniformly apply a molding pressure in a central direction of the rotary component.

9 Claims, 4 Drawing Sheets

(51) Int. Cl.

| | |
|---|---|
| ***B29C 70/54*** | (2006.01) |
| ***B29K 307/04*** | (2006.01) |
| ***B29L 31/00*** | (2006.01) |
| *B29K 63/00* | (2006.01) |

(52) U.S. Cl.
CPC ...... *B29K 2063/00* (2013.01); *B29K 2307/04* (2013.01); *B29K 2995/0003* (2013.01); *B29L 2031/749* (2013.01)

(58) Field of Classification Search
CPC ............ B29K 2101/10; B29K 2905/02; B29K 2905/10; B29C 2043/3244; B29C 33/0022
See application file for complete search history.

(56) References Cited

U.S. PATENT DOCUMENTS

| | | | | |
|---|---|---|---|---|
| 2016/0059500 | A1* | 3/2016 | Hosokawa | B29C 70/48 425/521 |
| 2020/0039156 | A1* | 2/2020 | Wang | B29C 33/40 |
| 2022/0305699 | A1* | 9/2022 | Ozaki | B29C 70/549 |

FOREIGN PATENT DOCUMENTS

| | | | | | |
|---|---|---|---|---|---|
| FR | 2638672 | A1 | * | 5/1990 | B64G 99/00 |
| GB | 2542662 | A | * | 3/2017 | B29C 70/68 |
| JP | 62-135349 | A | | 6/1987 | |
| JP | S62211112 | A | * | 9/1987 | |
| JP | 3-272832 | A | | 12/1991 | |
| JP | 4-294126 | A | | 10/1992 | |
| JP | 2005-312250 | A | | 11/2005 | |
| JP | 2007-268726 | A | | 10/2007 | |
| JP | 2008-18623 | A | | 1/2008 | |
| JP | 2008018623 | A | * | 1/2008 | |
| WO | WO2021/005774 | A1 | | 1/2021 | |

OTHER PUBLICATIONS

Written Opinion of the International Searching Authority, issued in PCT/JP2022/034363, PCT/ISA/237, dated Nov. 8, 2022.

* cited by examiner

MANUFACTURING DEVICE AND MOLDING METHOD FOR ROTARY-COMPONENT REINFORCEMENT CARBON FIBER REINFORCED PLASTIC

TECHNICAL FIELD OF THE INVENTION

The present invention relates to a manufacturing device and a molding method for a rotary-component reinforcement carbon fiber reinforced plastic.

BACKGROUND ART OF THE INVENTION

In order to reinforce a rotary component, a technology is known in which a carbon fiber reinforced plastic (hereinafter, sometimes abbreviated as CFRP) is molded on the outer surface of the rotary component. For example, in order to reinforce a rotor of a motor, a ring made of CFRP may be molded on the outer circumferential surface of the rotor. Molding of this ring made of CFRP has conventionally been carried out, for example, as follows.

A prepreg (for example, a unidirectional prepreg) comprising a thermosetting resin and carbon fibers is wound on the outer circumferential surface of the rotor provided as a rotary component, a wrapping tape (for example, a wrapping tape having a high thermal resistance) is wound thereon, the assembly is heated in an oven to cure the thermosetting resin and mold a ring made of CFRP with a predetermined shape, and after the ring is molded, the tape is removed. By such a molding method, a rotor whose outer circumferential surface is reinforced with a CFRP ring can be obtained.

However, in the conventional molding method as described above, it is difficult to automate the winding and removal of the wrapping tape, which is particularly time-consuming. Therefore, there is a strong demand for an innovative improved technology or a completely different molding technology as a molding technology for a CFRP ring for reinforcing a rotary component, required with shortening of manufacturing time and mass productivity.

Further, the wrapping tape as a secondary material is difficult to reuse due to its usage manner, so it has to be disposable, and there is also a problem that a lot of cost is required for the secondary material.

On the other hand, various technologies related to the present invention that utilize thermal expansion of a rubber or an elastomer for molding are known (for example, Patent documents 1 to 3), but any of these conventional molding technologies is difficult to apply to CFRP molding for reinforcement of a rotary component. Further, when it is required to mold a CFRP ring as the outermost layer of a rotary component having a circular cross section for reinforcement of the rotary component, it is desirable that the molding pressure is applied evenly toward the center of the rotary component, but none of the technologies is available to satisfy such a demand.

PRIOR ART DOCUMENTS

Patent Documents

Patent document 1: JP-A-HEI 4-294126
Patent document 2: JP-A-HEI 3-272832
Patent document 3: JP-A-2008-018623

SUMMARY OF THE INVENTION

Problems to be Solved by the Invention

Accordingly, an object of the present invention is to provide a manufacturing device and a molding method for a rotary-component reinforcement carbon fiber reinforced plastic, capable of shortening manufacturing time and exhibiting an excellent mass productivity with inexpensive facilities in order to be adaptable to mass production especially when molding a desired CFRP ring for reinforcement of a rotary component having a circular cross section as an outermost layer of the rotary component, capable of achieving a low manufacturing cost due to the unnecessity of a disposable secondary material and the repetitive reuse of a member to be used, and capable of evenly applying a molding pressure in a central direction of the rotary component to be able to perform a desirable molding.

Means for Solving the Problems

To achieve the above-described objects, the present invention has the following constitutions.

(1) A manufacturing device for a rotary-component reinforcement carbon fiber reinforced plastic, the manufacturing device molding a ring comprising a carbon fiber reinforced plastic for reinforcement of a rotary component having a circular cross section as an outermost layer of the rotary component, characterized in that, in a mold in which a unidirectional prepreg comprising a thermosetting resin and carbon fibers and being wound on the rotary component is heated and cured, an annular pressure source utilizing its own thermal expansion exists between a cavity of the mold and the unidirectional prepreg.

(2) The manufacturing device for a rotary-component reinforcement carbon fiber reinforced plastic according to (1), wherein the pressure source is a flexible object with a linear expansion coefficient of $1\times10^{-4}/°$ C. or more.

(3) The manufacturing device for a rotary-component reinforcement carbon fiber reinforced plastic according to (2), wherein a material of the flexible object is a silicone rubber or fluoro rubber.

(4) The manufacturing device for a rotary-component reinforcement carbon fiber reinforced plastic according to any one of (1) to (3), wherein the mold is made of a non-magnetic material.

(5) The manufacturing device for a rotary-component reinforcement carbon fiber reinforced plastic according to any one of (1) to (4), wherein a thickness of the pressure source is in a range of 1 to 100 times the thickness of the unidirectional prepreg.

(6) The manufacturing device for a rotary-component reinforcement carbon fiber reinforced plastic according to any one of (1) to (5), wherein at least two or more cavities exist in one mold.

(7) The manufacturing device for a rotary-component reinforcement carbon fiber reinforced plastic according to any one of (1) to (6), wherein the pressure source is in contact with the unidirectional prepreg and has a certain gap with the mold.

(8) A molding method for a rotary-component reinforcement carbon fiber reinforced plastic, the method molding a ring comprising a carbon fiber reinforced plastic for reinforcement of a rotary component having a circular cross section as an outermost layer of the rotary component, characterized in that, in a process in which a unidirectional prepreg comprising a thermosetting resin and carbon fibers, is heated and cured in a mold after being wound on the rotary component, an annular pressure source utilizing its own thermal expansion is interposed between a cavity of the mold and the unidirectional prepreg, and an external pressure is applied to the prepreg by the pressure source.

(9) The molding method for a rotary-component reinforcement carbon fiber reinforced plastic according to (8), wherein the pressure source is a flexible object with a linear expansion coefficient of $1\times10^{-4}$/° C. or more.

(10) The molding method for a rotary-component reinforcement carbon fiber reinforced plastic according to (9), wherein a material of the flexible object is a silicone rubber or fluoro rubber.

(11) The molding method for a rotary-component reinforcement carbon fiber reinforced plastic according to any one of (8) to (10), wherein an external pressure of 0.1 MPa or more and 10 MPa or less is applied to the unidirectional prepreg by the pressure source.

(12) The molding method for a rotary-component reinforcement carbon fiber reinforced plastic according to any one of (8) to (11), wherein the mold is made of a non-magnetic material.

(13) The molding method for a rotary-component reinforcement carbon fiber reinforced plastic according to any one of (8) to (12), wherein a thickness of the pressure source is in a range of 1 to 100 times the thickness of the unidirectional prepreg.

(14) The molding method for a rotary-component reinforcement carbon fiber reinforced plastic according to any one of (8) to (13), wherein at least two or more cavities exist in one mold, and at least two or more rings are molded at the same time.

(15) The molding method for a rotary-component reinforcement carbon fiber reinforced plastic according to any one of (8) to (14), wherein the pressure source is in contact with the unidirectional prepreg and has a certain gap with the mold before heating.

(16) The molding method for a rotary-component reinforcement carbon fiber reinforced plastic according to any one of (8) to (15), wherein the cavity of the mold is formed as a through hole, the rotary component, the unidirectional prepreg and the pressure source are assembled in a predetermined positional relationship to form a pre-assembly, and after the pre-assembly is inserted into the through hole from one side and the ring is molded, the assembly in which the ring is molded is demolded from the other side of the through hole.

(17) The molding method for a rotary-component reinforcement carbon fiber reinforced plastic according to (16), wherein when demolding the assembly, the pressure source is thermally shrunk to be demolded by locally cooling the assembly while keeping the temperature of the mold constant.

(18) The molding method for a rotary-component reinforcement carbon fiber reinforced plastic according to (16) or (17), wherein the pressure source is removed from the demolded assembly and the removed pressure source is repeatedly used.

Effect According to the Invention

According to the manufacturing device and molding method for a rotary-component reinforcement carbon fiber reinforced plastic of the present invention, by the thermal expansion of the annular pressure source itself, which is made of a flexible object or the like, interposed between the cavity of the mold (more precisely, the inner circumferential surface of the cavity) and the unidirectional prepreg (more precisely, the outer circumferential surface of the unidirectional prepreg), the unidirectional prepreg having been wound on the rotary component is evenly pressurized toward the center of the rotary component having a circular cross section by the pressure source relative to the inner circumferential surface of the cavity of the mold as a fixed surface, the unidirectional prepreg is heated and cured while the uniform molding pressure due to this external pressure is being applied, and the CFRP ring for reinforcement of the rotary component is molded into a desired form, namely, into a CFRP ring having a desired target thickness uniformly over the entire circumference. The uniform molding pressure due to the above-described external pressure can be easily set to a desired pressure depending upon the material of the pressure source, the dimensions before heating between the cavity of the mold and the unidirectional prepreg, the heating temperature, etc.

In this molding of the CFRP ring, own thermal expansion of the pressure source accompanying with heating of the mold for curing the unidirectional prepreg is utilized, but after molding the pressure source may be removed from the CFRP ring, and by appropriately selecting the material of the pressure source, the removed pressure source can be reused repeatedly by cooling it to its initial state or by thermal shrinkage due to cooling to a certain extent, a disposable secondary material in the conventional method using a wrapping tape is unnecessary, and therefore, it becomes possible to reduce the manufacturing cost.

Further, in the molding according to the present invention, a CFRP ring for reinforcement can be molded for a rotary component as long as a mold capable being heated and having a cavity of a predetermined size and a pressure source as described above are prepared, it becomes possible to manufacture a targeted CFRP ring for reinforcing the rotary component easily and quickly in a short time with simple and inexpensive facilities, and excellent mass productivity can be realized. Furthermore, if a mold with a plurality of cavities is used, it becomes possible to mold a plurality of CFRP rings for reinforcement at the same time, thereby making it possible to adapt even to higher mass production.

EMBODIMENTS FOR CARRYING OUT THE INVENTION

Hereinafter, embodiments of the present invention will be explained referring to figures.

Figure 1:
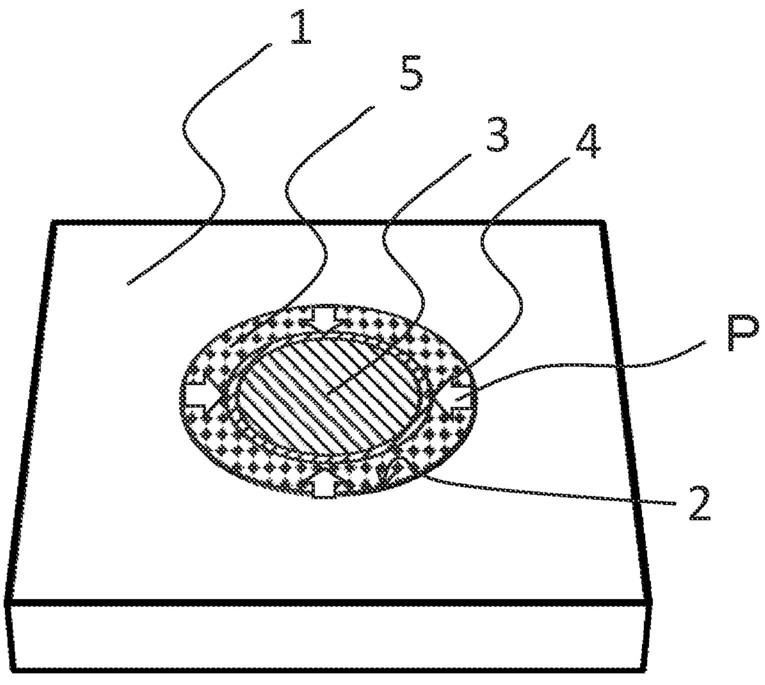
FIG. 1 is a schematic perspective view showing a molding method for a rotary-component reinforcement CFRP according to an embodiment of the present invention.
Figure 2:
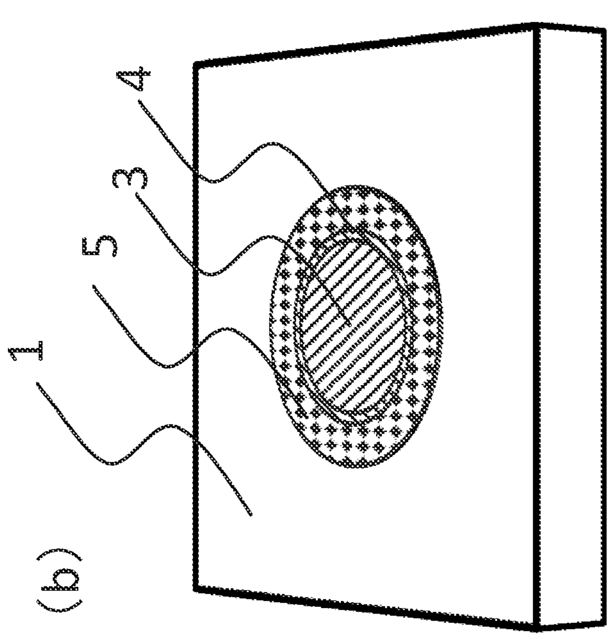
FIG. 2 shows a schematic perspective view of a mold in a manufacturing device for a rotary-component reinforcement CFRP according to an embodiment of the present invention (FIG. 2(*a*)) and a schematic perspective view showing a state where a pre-assembly of a rotary component, a unidirectional prepreg and a pressure source is inserted into a cavity of the mold (FIG. 2(*b*)).
Figure 2:
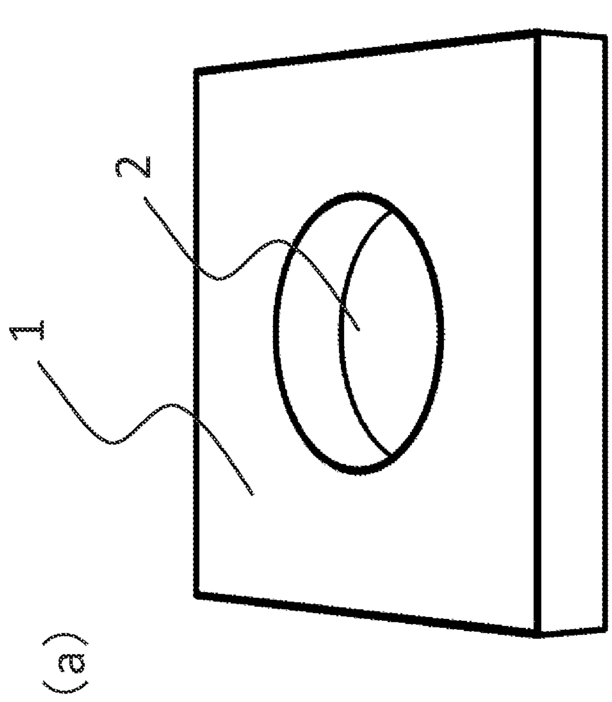
Figure 4:
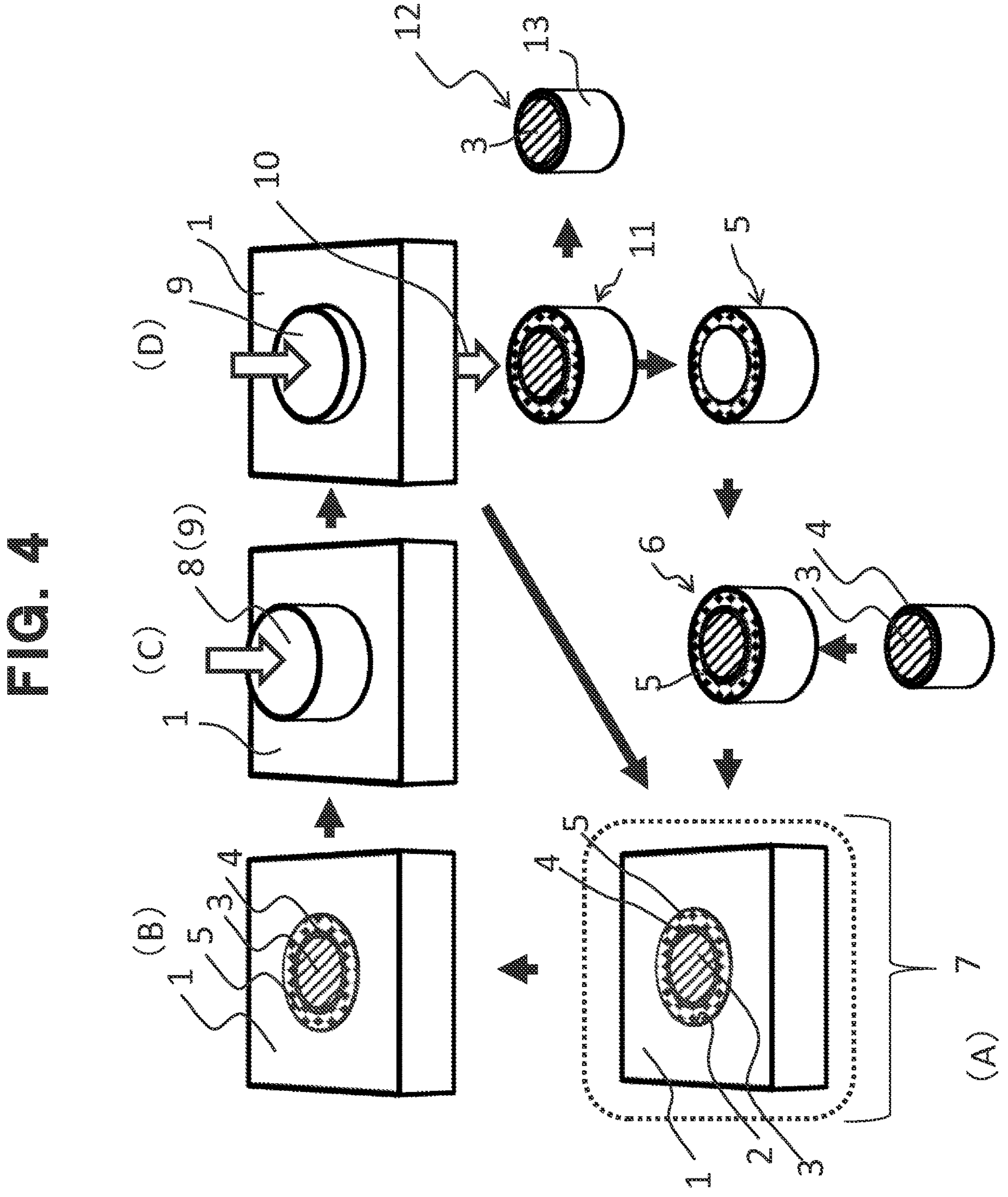
FIG. 4 is a schematic perspective view showing an example of a molding cycle in a molding method for a rotary-component reinforcement CFRP according to an embodiment of the present invention.

FIG. 1 shows a molding method for a rotary-component reinforcement CFRP according to an embodiment of the present invention, and FIG. 2 shows a manufacturing device for a rotary-component reinforcement CFRP according to an embodiment of the present invention. In FIGS. 1 and 2, symbol 3 indicates a rotary component having a circular cross section relative to the rotation axis, and for reinforcement for this rotary component 3, a ring made of CFRP is molded as the outermost layer (in FIG. 4, shown as a molded reinforcement CFRP ring 13).

The reinforcement CFRP ring described above is molded by a process in which a unidirectional prepreg 4 comprising a thermosetting resin and carbon fibers is wound on the rotary component 3 and then heated and cured in the mold 1. A cavity 2 with a circular cross section is formed in the mold 1, and between the cavity 2 of mold 1 (inner circumferential surface of the cavity 2) and the unidirectional prepreg 4 (outer circumferential surface of the unidirectional prepreg 4) inserted into the cavity 2 together with the rotary component 3, an annular pressure source 5 is interposed. This annular pressure source 5 can apply an external pressure (for example, external pressure P shown in FIG. 1) to the unidirectional prepreg 4 against the inner circumferential surface of the cavity 2 by utilizing its own thermal expansion caused by heating of the mold 1, and the unidirectional prepreg 4 is heated and cured while being applied with the external pressure P, and is formed into a reinforcement CFRP ring.

The kind of the thermosetting resin for the above-described unidirectional prepreg 4 comprising the thermosetting resin and carbon fibers is not particularly limited, and epoxy resins, cyanate ester resins, bismaleimide resins, polyimide resins, etc. can be used, and among them, epoxy resins are preferred. The kind of carbon fibers also is not particularly limited, and from the viewpoint capable of effectively reinforcing the rotary component 3 (for example, effectively reinforcing the rotary component 3 that rotates at a high speed against its centrifugal force), carbon fibers continuously extending in the circumferential direction of the rotary component 3 are preferred. The unidirectional prepreg 4 may only contain a unidirectional prepreg having carbon fibers extending continuously in the circumferential direction of the rotary component 3, and in addition to a single layer configuration of the unidirectional prepreg, it may be a laminated configuration of the unidirectional prepregs, and a laminated configuration with another layer having carbon fibers extending in another direction, and further, a laminated configuration with another layer (for example, a prepreg layer containing a woven fabric). Further, the thickness in the radial direction of the rotary component of the unidirectional prepreg 4 is not particularly limited, but from the viewpoint of reducing the size and weight of the rotary component 3 with a reinforcement CFRP ring, because it is sufficient to ensure the thickness necessary for reinforcement, it is preferred to be as small as possible.

The material of the pressure source 5 is not particularly limited as long as it can apply the targeted external pressure P to the unidirectional prepreg 4 utilizing its own thermal expansion, but for example, it is preferably a material of a flexible object having a linear expansion coefficient of $1\times10^{-4}$/° C. or more and $10\times10^{-4}$/° C. or less. As a material of a flexible object having such a linear expansion coefficient, for example, a fluoro rubber can be exemplified. A more preferable linear expansion coefficient of the flexible object is $2\times10^{-4}$/° C. or more and $5\times10^{-4}$/° C. or less. As a material of a flexible object having such a linear expansion coefficient, for example, a silicone rubber can be exemplified. Since the silicone rubber and fluoro rubber have a good mold releasability, they can be mentioned to be preferable materials also for a demolding process shown in FIG. 4, which is described later.

The external pressure P applied by the pressure source 5 during heating and curing of the unidirectional prepreg 4 is not particularly limited as long as the CFRP ring after the unidirectional prepreg 4 is cured is molded to the targeted thickness, but if it is too small, there is a possibility that the CFRP ring is not molded at a targeted thickness or a uniform thickness, and if it is too large, there is a possibility that it gives an unexpected affection to the rotary component 3. A preferable external pressure P is, for example, in a range of 0.1 MPa or more and 10 MPa or less. A more preferable range of the external pressure P is 0.2 MPa or more and 8 MPa or less.

The thickness of the pressure source 5 also is not particularly limited as long as the external pressure P to the unidirectional prepreg 4 due to its own thermal expansion is within a preferable range and an even external pressure P can be applied, but if the thickness is too small, there is a possibility that it becomes difficult to apply an even external pressure P within a preferable range, and if it is too large, it may cause an unexpected deformation of itself during thermal expansion, and there is a possibility that it becomes difficult to apply an even external pressure P. The thickness of the pressure source 5 is preferably in the range of 1 to 100 times the thickness of the unidirectional prepreg 4, and more preferably in the range of 2 to 80 times.

Before the pressure source 5 is heated and thermally expanded, namely, at a state where the unidirectional prepreg 4 is inserted into the cavity 2 of the mold 1 together with the rotary component 3 and the annular pressure source 5 is interposed between the cavity 2 and the unidirectional prepreg 4, the pressure source 5 is preferably in contact with the unidirectional prepreg 4 and preferably has a certain gap with the mold 1 (with the inner circumferential surface of the cavity 2 of the mold 1). Since the unidirectional prepreg 4 is molded into the reinforcement CFRP ring of the rotary component 3, it is of course preferred that the unidirectional prepreg 4 is brought into contact with the pressure source 5 and held in a predetermined positional relationship there with before the external pressure P is applied, and as shown in FIG. 4 described later, because it is preferred for the process to insert the pressure source 5 into the cavity 2 of the mold 1 together with the rotary component 3 and the unidirectional prepreg 4 wound thereon (that is, as a pre-assembly), in order to ensure insertion during the process, and in addition, from the viewpoint of ease of demolding of the CFRP ring after heating, curing and molding, the pressure source 5 preferably has a certain gap with the inner circumferential surface of the cavity 2 of the mold 1 before heating. In this way, the pressure source 5 (for example, the pressure source 5 provided on the unidirectional prepreg 4) can be easily inserted into the cavity 2 of the mold 1 before heating, curing and molding of the CFRP ring, and after heating, curing and molding, preferably after the pressure source 5 is thermally shrunk to some extent, it becomes possible to easily demold the pressure source 5 from the mold 1 together with the molded CFRP ring.

Further, in case where the rotary component 3 which is a molding object of a reinforcement CFRP ring is, for example, a rotor of a motor, or the like, there is a case where the rotary component 3 has a magnet. In such a case, if the mold 1 is made of a magnetic material, when inserting the above-described pre-assembly into the cavity 2 of the mold 1, there is a possibility that it becomes difficult to insert it into the target position due to the magnetic force of the rotary component 3. If the mold 1 is made of a non-magnetic material (for example, a non-magnetic metal), such a possibility can be eliminated.

Figure 3:
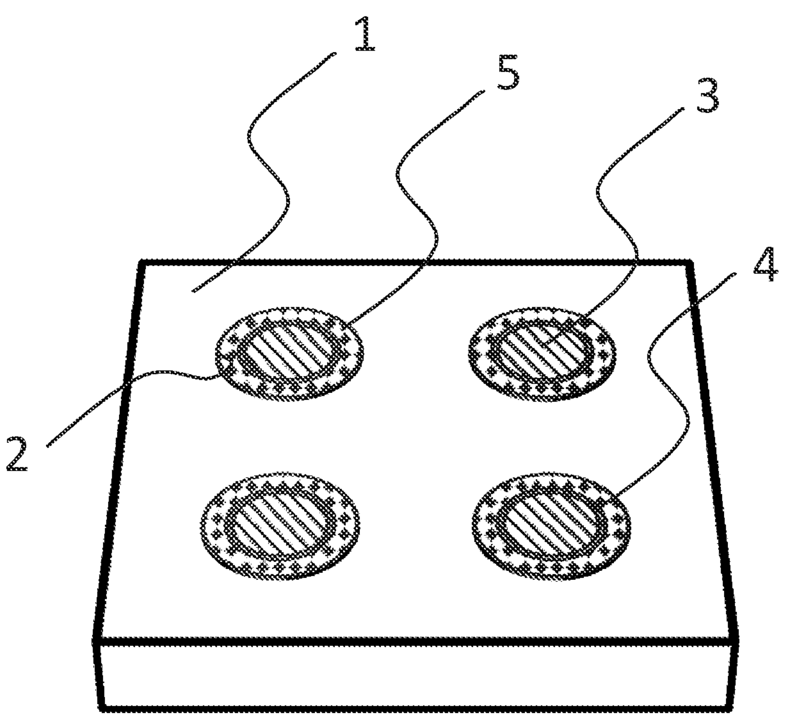
FIG. 3 is a schematic perspective view of a manufacturing device for a rotary-component reinforcement CFRP according to another embodiment of the present invention.

In the manufacturing device and molding method for a rotary-component reinforcement CFRP according to the present invention as described above, for example, as shown in FIG. 3, it is possible to let two or more cavities exist in a single mold 1 and mold at least two or more CFRP rings at the same time. By heating one mold 1, heating and curing of the unidirectional prepregs 4 can be performed simultaneously on a plurality of unidirectional prepregs 4 while applying external pressure due to thermal expansion of the pressure sources 5 as described above, and it becomes possible to mold a plurality of targeted CFRP rings at the same time. By such device and process, mass productivity can be greatly improved and mass production easily becomes possible at a low cost. Where, although FIG. 3 shows an example in which there are four cavities 2, because the number of cavities 2 and the number of molds 1 can be easily increased, it is possible to easily cope with the production of a huge amount.

Furthermore, in the manufacturing device and molding method for a rotary-component reinforcement CFRP according to the present invention, a process as exemplified in FIG. 4 is preferably employed in order to cope with mass production and to reduce manufacturing cost. Although FIG. 4 shows an example where one cavity 2 exists in one mold 1 as shown in FIG. 1, it is also applicable to a case where a plurality of cavities 2 exist in one mold 1 as shown in FIG. 3.

In the example shown in FIG. 4, the cavity 2 of the mold 1 is formed as a through hole, the rotary component 3, the unidirectional prepreg 4 wound thereon, and the pressure source 5 provided thereon are assembled in a predetermined positional relationship, the pre-assembly 6 thereof is inserted into the through hole forming the cavity 2 from one side (from above), and in the heating and curing process 7 (process (A)), as shown in FIG. 1, while the external pressure is applied to the unidirectional prepreg 4 utilizing the thermal expansion of the pressure source 5 due to heating, the unidirectional prepreg 4 is molded into a reinforcement CFRP ring by heating and curing.

Process (B) in FIG. 4 shows the state immediately after heating and curing of the unidirectional prepreg 4, and in the process (C), a local cooling mechanism 8 is brought into contact with the unidirectional prepreg 4, the pressure source 5 and the rotary component 3 immediately after heating and curing, the assembly of the rotary component 3, the heated and cured unidirectional prepreg 4 and the pressure source 5 is locally cooled, and the pressure source 5 is thermally shrunk while keeping the temperature of the mold 1 substantially constant. In the illustrated example, the local cooling mechanism 8 is incorporated into the demolding mechanism 9.

When the pressure source 5 is thermally shrunk to a certain extent, the state approaches the initial state, and the state becomes a condition where a gap exists between the pressure source 5 and the inner circumferential surface of the through hole forming the cavity 2, which is the initial state before heating, or a state close to it. In process (D), an assembly 11 of the rotary component 3, the unidirectional prepreg 4 molded into a reinforcement CFRP ring by heating and curing, and the pressure source 5, is easily demolded from the other side of the through hole (from the lower side) by the demolding mechanism 9 that is pushed in from above (demolding process 10).

The pressure source 5 is removed from the demolded assembly 11, and the removed pressure source 5 is repeatedly reused to assemble the pre-assembly 6 described above for the next molding. The assembly 11 from which the pressure source 5 has been removed becomes a rotary component 12 with a reinforcement CFRP ring as a targeted product (that is, a rotary component 3 provided with a reinforcement CFRP ring 13 molded as the outermost layer).

The series of manufacturing or molding processes described above are repeatable processes, and since the heating, curing and molding process of the unidirectional prepreg 4 utilizing thermal expansion of the pressure source 5 is also a process capable of being performed while continuously moving the pre-assembly 6 and the molded assembly 11 from above to below relative to the cavity 2 of the mold 1 formed as a through hole, the series of processes can easily deal with mass production and can also be automated.

INDUSTRIAL APPLICABILITY

The present invention is applicable to the manufacture of any rotary component that requires molding of a reinforcement CFRP ring for a rotary component having a circular cross section.

EXPLANATION OF SYMBOLS

1: mold
2: cavity
3: rotary component
4: unidirectional prepreg
5: pressure source
6: pre-assembly
7: heating and curing process
8: local cooling mechanism
9: demolding mechanism
10: demolding process
11: assembly
12: rotary component with reinforcement CFRP ring
13: molded reinforcement CFRP ring
P: external pressure.

The invention claimed is:

1. A molding method for a rotary-component reinforcement carbon fiber reinforced plastic, the method molding a ring comprising a carbon fiber reinforced plastic for reinforcement of a rotary component having a circular cross section as an outermost layer of the rotary component, characterized in that, in a process in which a unidirectional prepreg, comprising a thermosetting resin and carbon fibers, is heated and cured in a mold after being wound on the rotary component, an annular pressure source utilizing its own thermal expansion is interposed between a cavity of the mold and the unidirectional prepreg, and an external pressure is applied to the unidirectional prepreg by the annular pressure source;

wherein the cavity of the mold is formed as a through hole, the rotary component, the unidirectional prepreg and the annular pressure source are assembled in a predetermined positional relationship to form a pre-assembly, and after the pre-assembly is inserted into the through hole from one side and the ring is molded, an assembly in which the ring is molded is demolded from the other side of the through hole opposite the one side; and wherein when demolding the assembly in which the ring is molded, the annular pressure source is thermally shrunk to be demolded by locally cooling the assembly in which the ring is molded while keeping a temperature of the mold constant.

2. The molding method for a rotary-component reinforcement carbon fiber reinforced plastic according to claim 1, wherein the annular pressure source is removed from the demolded assembly in which the ring is molded and the removed annular pressure source is repeatedly used.

3. The molding method for a rotary-component reinforcement carbon fiber reinforced plastic according to claim 1, wherein the annular pressure source is a flexible object with a linear expansion coefficient of $1\times10^{-4}$/° C. or more.

4. The molding method for a rotary-component reinforcement carbon fiber reinforced plastic according to claim 3, wherein a material of the flexible object is a silicone rubber or fluoro rubber.

5. The molding method for a rotary-component reinforcement carbon fiber reinforced plastic according to claim 1, wherein the external pressure of 0.1 MPa or more and 10 MPa or less is applied to the unidirectional prepreg by the annular pressure source.

6. The molding method for a rotary-component reinforcement carbon fiber reinforced plastic according to claim 1, wherein the mold is made of a non-magnetic material.

7. The molding method for a rotary-component reinforcement carbon fiber reinforced plastic according to claim 1, wherein a thickness of the annular pressure source is in a range of 1 to 100 times a thickness of the unidirectional prepreg.

8. The molding method for a rotary-component reinforcement carbon fiber reinforced plastic according to claim 1, wherein at least two or more cavities exist in one mold, and at least two or more rings are molded at the same time.

9. The molding method for a rotary-component reinforcement carbon fiber reinforced plastic according to claim 1, wherein the annular pressure source is in contact with the unidirectional prepreg and has a certain gap with the mold before heating.

* * * * *